Figure 3:
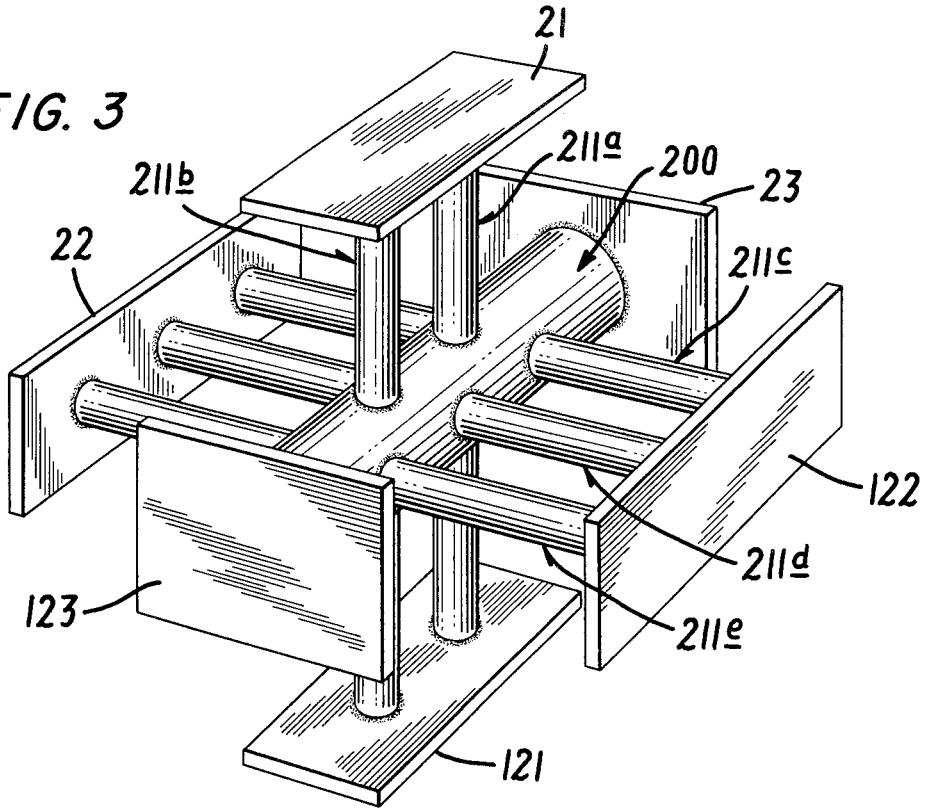
Figure 5:
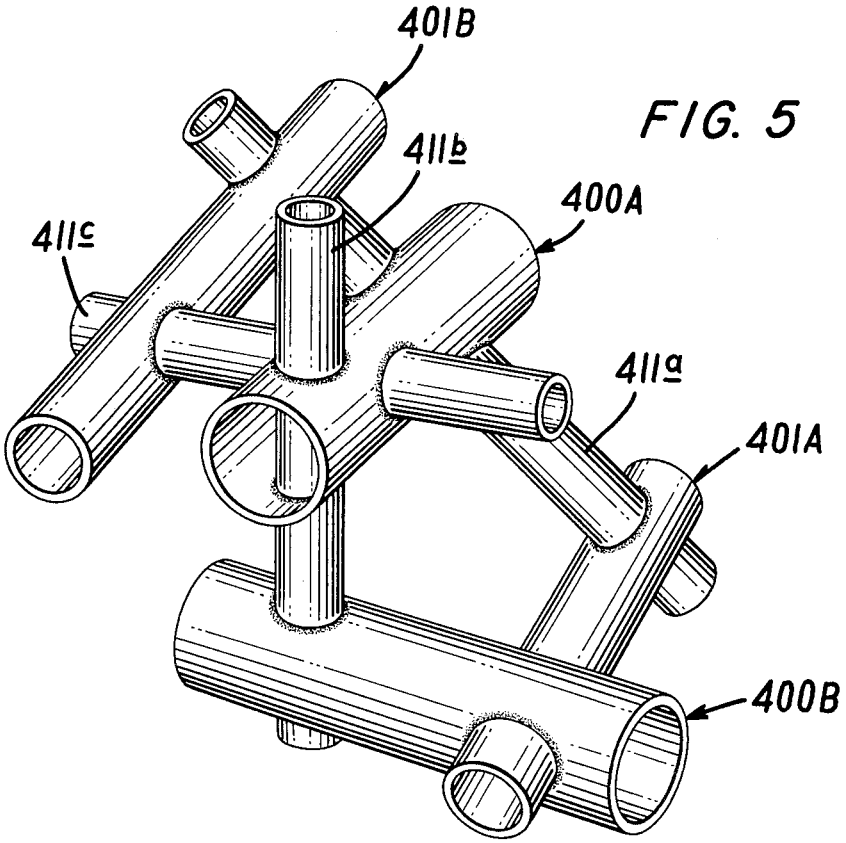
Figure 4:
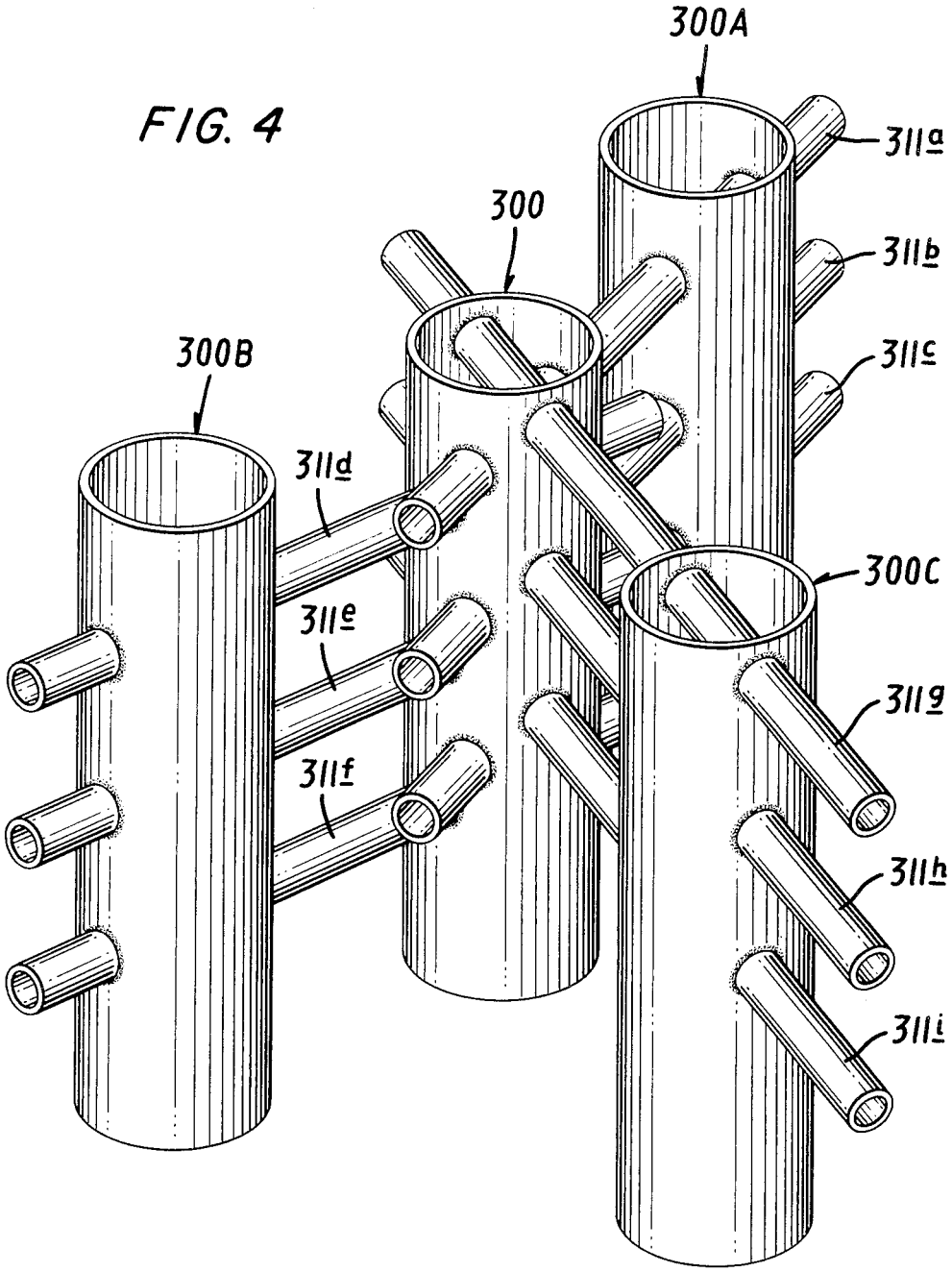
Figure 6:
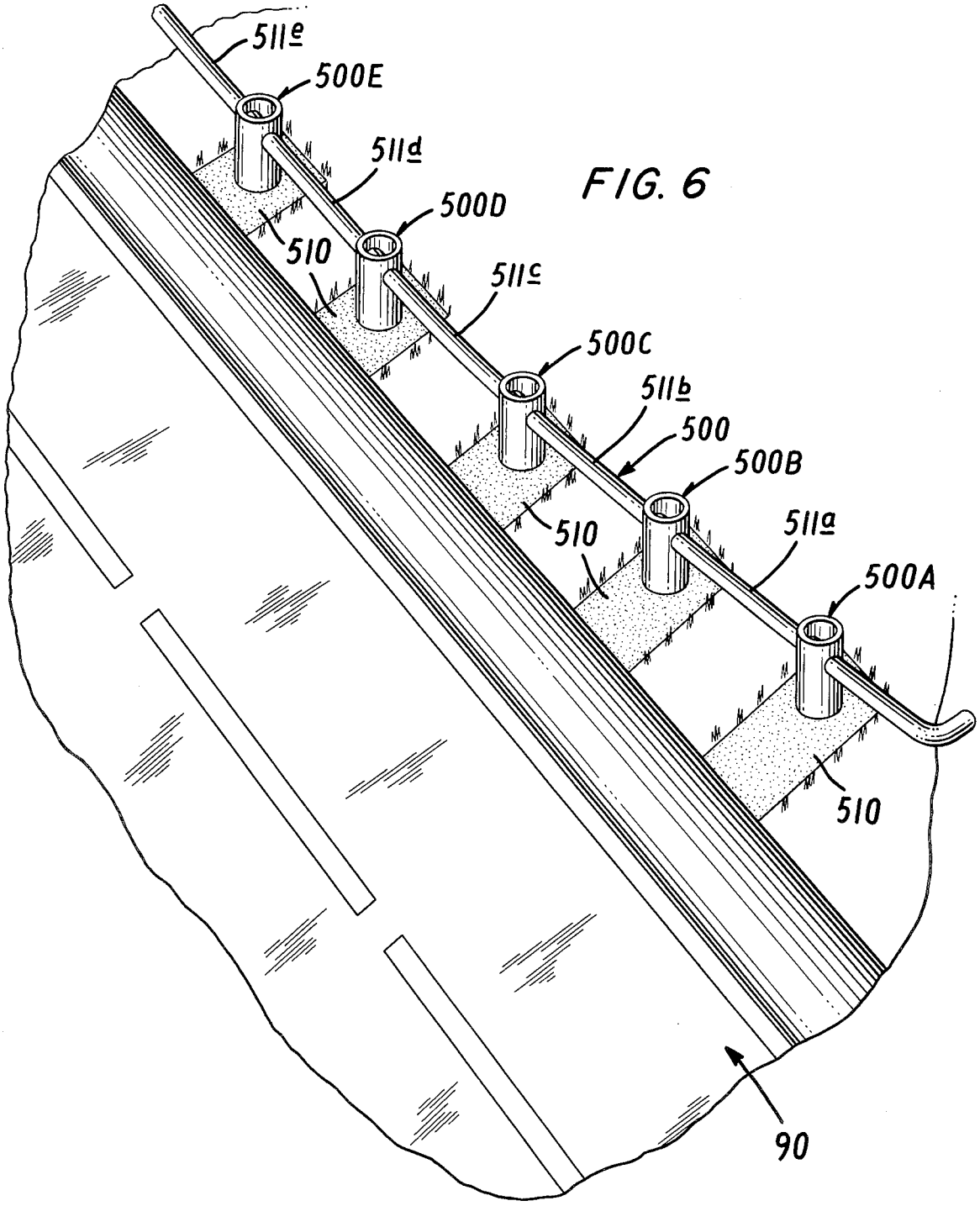
Figure 7:
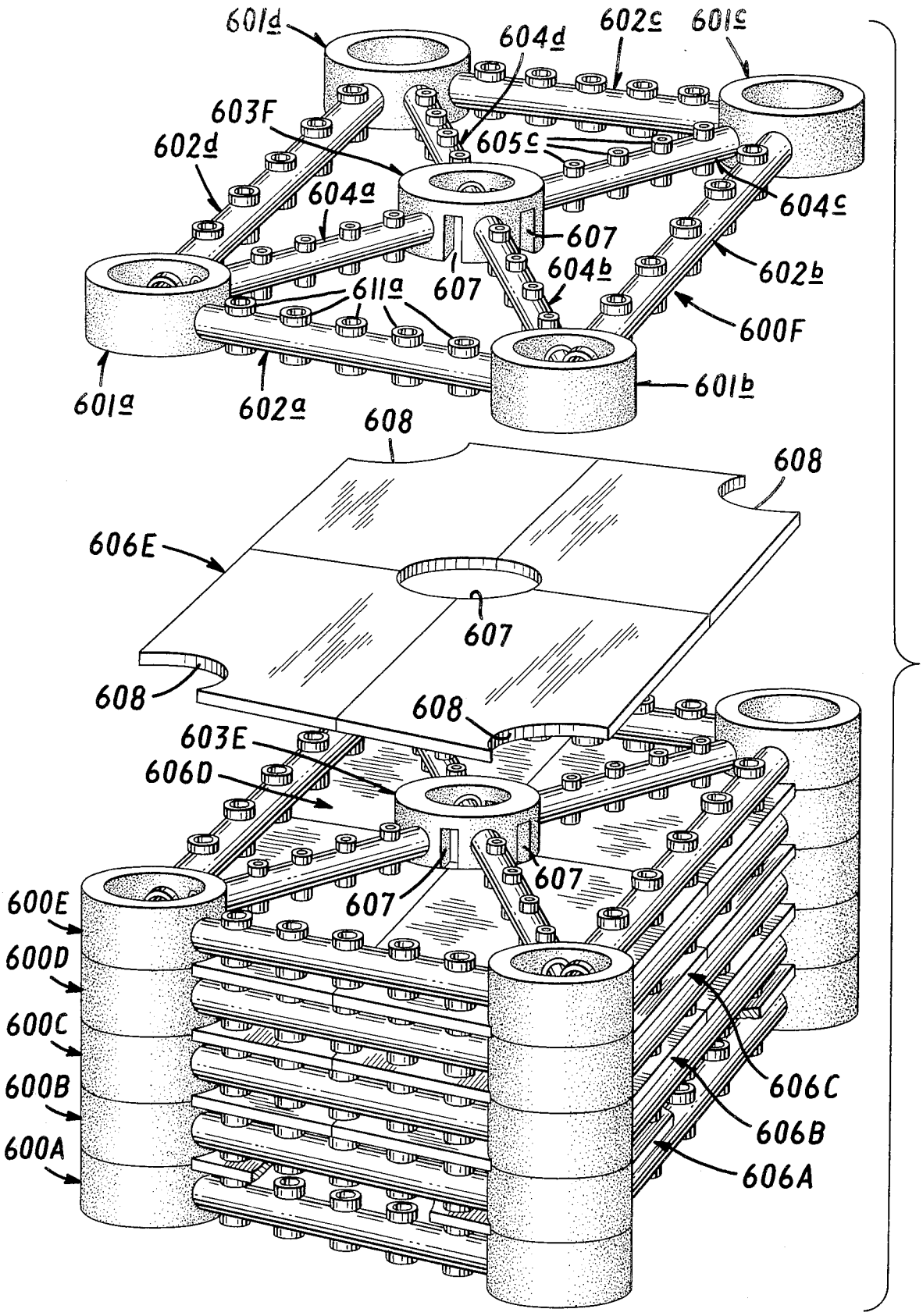
Figure 9:
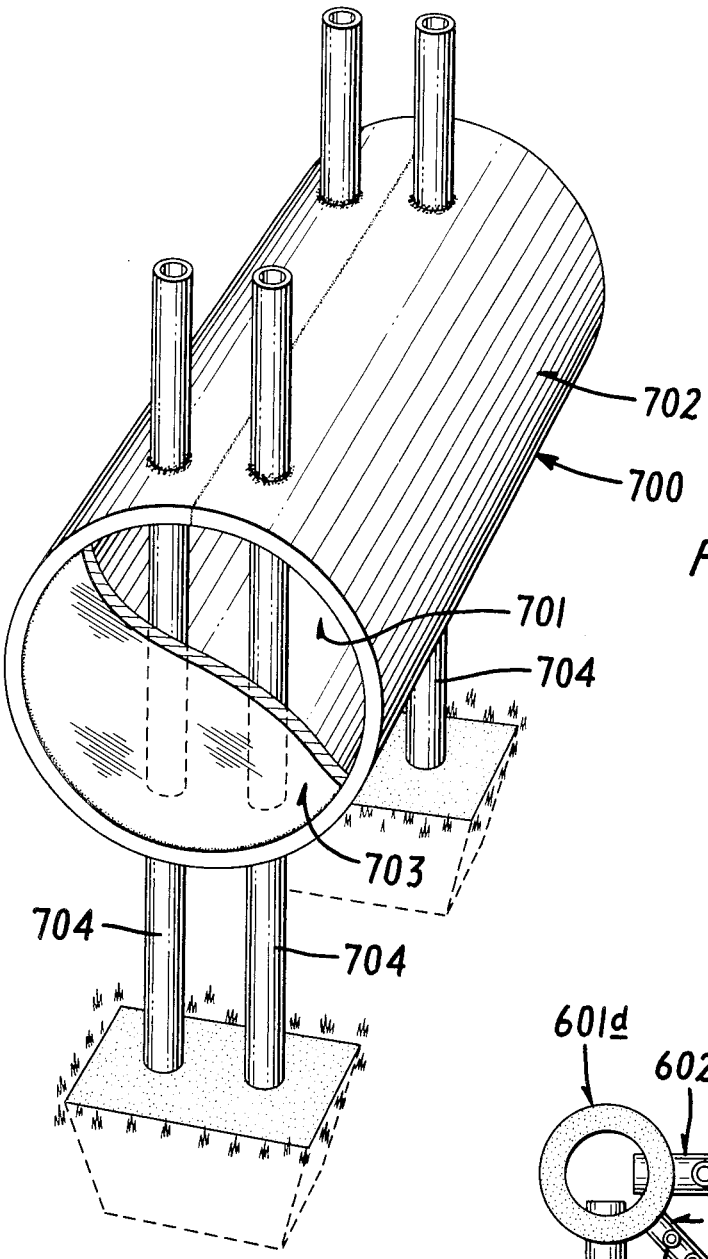
Figure 8:
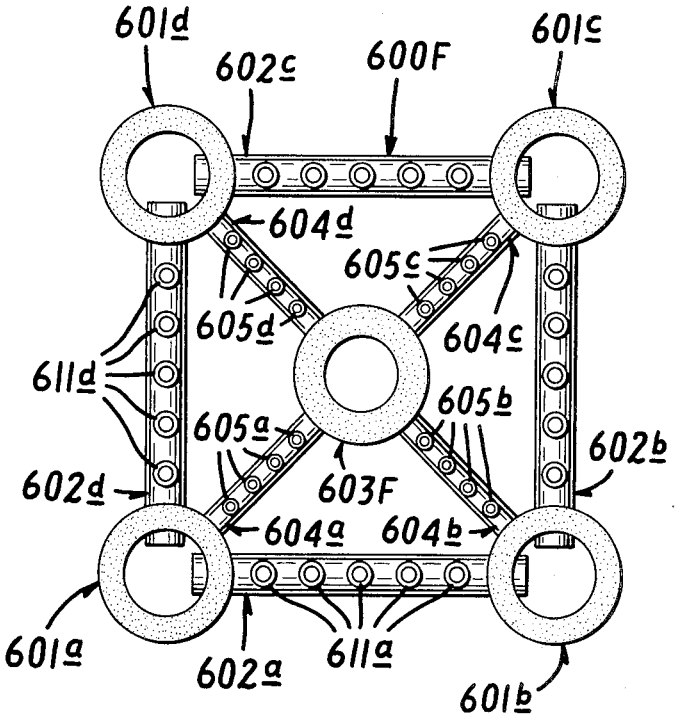

United States Defensive Publication [19] (H) [11] T964,001

Ferwerda [43] Nov. 1, 1977

[54] STRUCTURAL INTEGRATED ASSEMBLY OF RELATIVELY RIGID TUBULAR MEMBERS INCLUDING AT LEAST ONE SMALLER SUCH MEMBER EXTENDING THROUGH AND ANCHORED TO SUCH LARGER MEMBER

[76] Inventor: Thomas Norvin Ferwerda, 94 Brambach Road, Scarsdale, N.Y. 10583

[21] Appl. No.: 763,703

[22] Filed: Jan. 28, 1977

[51] Int. Cl.[2] ..... E04B 1/348

[52] U.S. Cl. ..... 52/637; 52/79.1; 220/69; 220/1 B; 256/13.1; 256/59

[57] ABSTRACT

Structural integrated assembly of relatively rigid tubular members that are formed of compositions selected from a group of metallic and plastic materials that are of the desired rigidity. The assembly includes at least a section of such relatively rigid tubular composition which is of relatively large internal cross-sectional dimensions, and at least one other relatively rigid tubular section which is in the form of a transversely smaller bridging member that extends transversely through openings in opposite sides of the relatively large tubular member there to provide two separate and spaced junctions. Suitable means integratively connect all circumambient points of the exterior surface of the smaller bridging member in each junction to all of the immediately adjacent points of the circumscribing edge of the opening in the larger tubular member thereat. The edges of the openings in the larger rigid tubular member that meet with the adjacent external surfaces of the smaller rigid member which extend therethrough are continuously anchored to the latter by joint weldings.

7 Claims, 6 Sheets Drawing,

15 Pages Specification

The file of this unexamined application may be inspected and copies thereof may be purchased (849 O.G. 1221, Apr. 9, 1968).

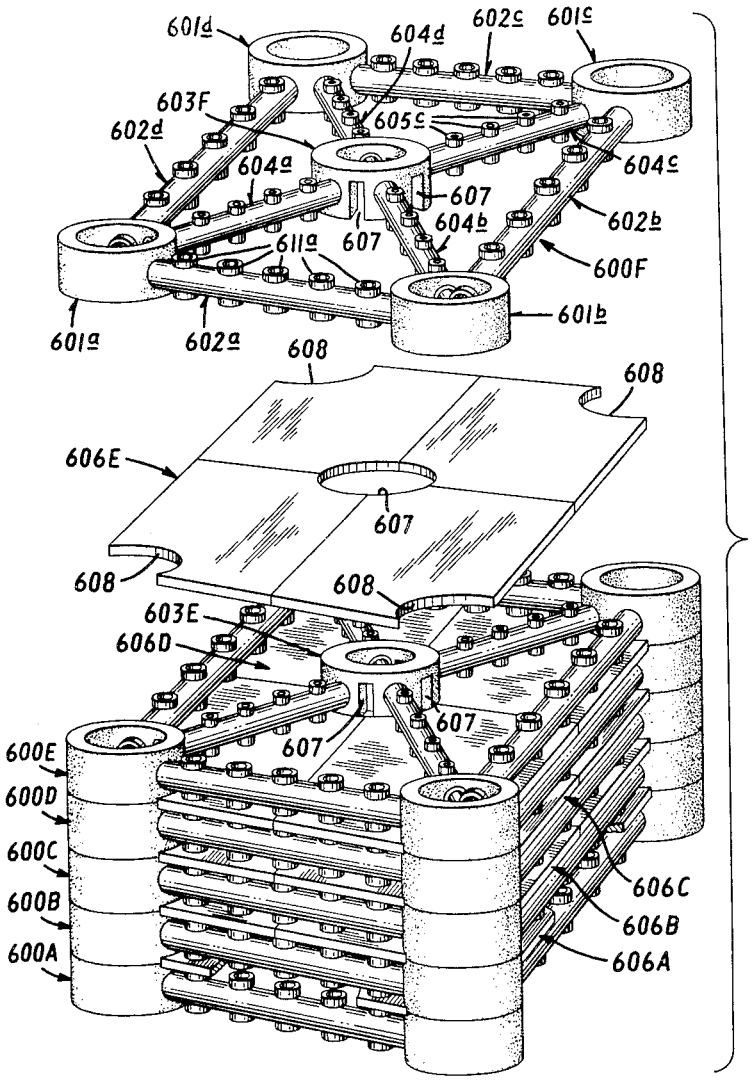

FIG. 1
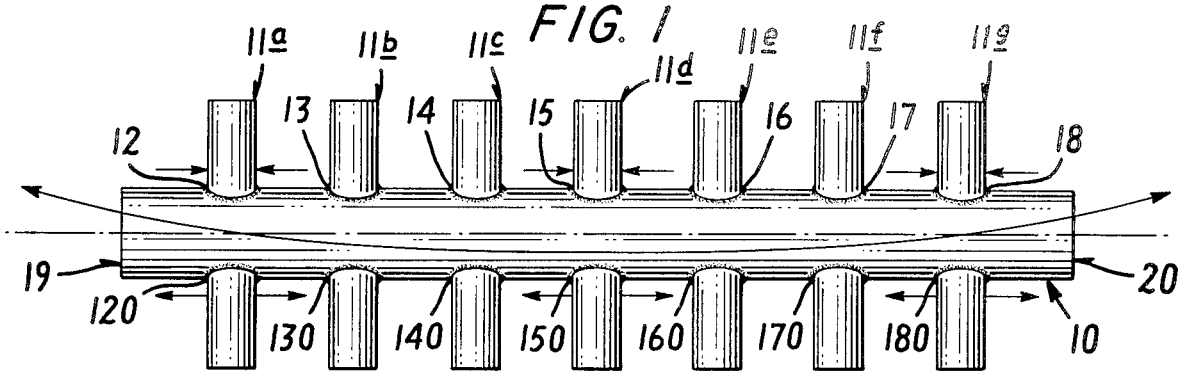
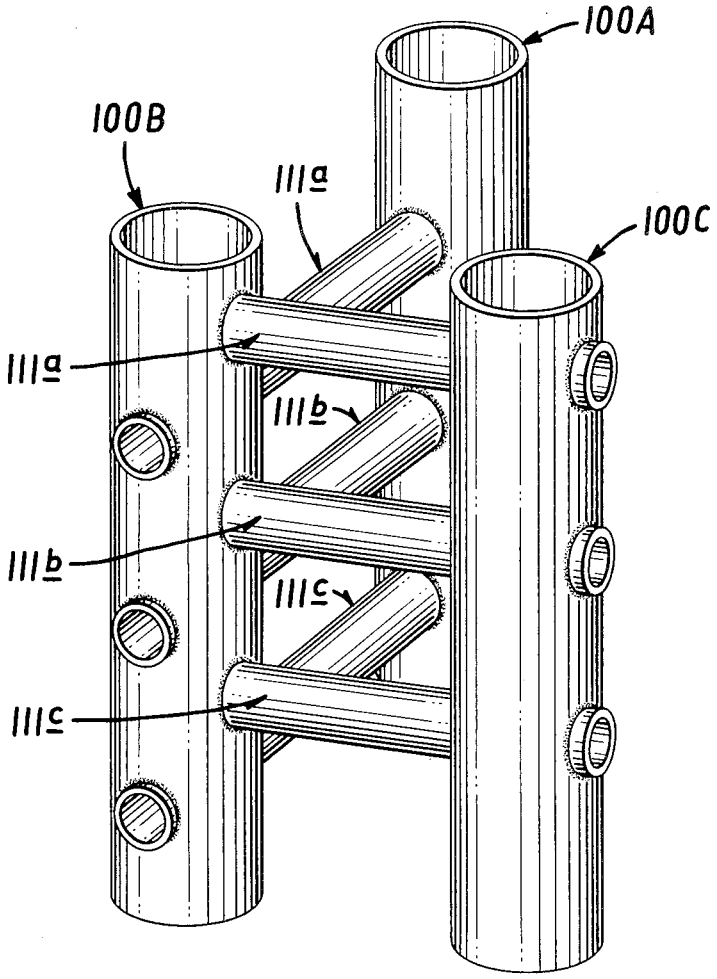
FIG. 2